United States Patent
Fuerstenberg et al.

(10) Patent No.: US 10,858,110 B2
(45) Date of Patent: Dec. 8, 2020

(54) CONNECTION SYSTEM FOR ELECTRICALLY CONNECTING A FIXTURE IN A VEHICLE

(71) Applicant: Airbus Operations GmbH, Hamburg (DE)

(72) Inventors: Malte Fuerstenberg, Hamburg (DE); Sergej Schwenk, Hamburg (DE); Rainer Ristow, Hamburg (DE); Lars Schomaker, Hamburg (DE); Alexander Schulz, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 16/452,164

(22) Filed: Jun. 25, 2019

(65) Prior Publication Data

US 2020/0002003 A1    Jan. 2, 2020

(30) Foreign Application Priority Data

Jun. 28, 2018   (DE) .......................... 10 2018 115 560

(51) Int. Cl.

| | | |
|---|---|---|
| *H01R 39/00* | (2006.01) | |
| *H01R 41/00* | (2006.01) | |
| *H01R 13/72* | (2006.01) | |
| *H01R 13/60* | (2006.01) | |
| *H01R 13/66* | (2006.01) | |
| *B64D 11/06* | (2006.01) | |

(Continued)

(52) U.S. Cl.
CPC ............ *B64D 11/0624* (2014.12); *B64C 1/18* (2013.01); *H02G 3/383* (2013.01); *B64D 2221/00* (2013.01)

(58) Field of Classification Search
CPC ...................................................... H01R 13/60
USPC ........................................... 439/4, 501, 528
See application file for complete search history.

(56) References Cited

U.S. PATENT DOCUMENTS 5,368,504 A * 11/1994 Muzslay ............. H02G 15/013
                                                                   439/607.44
5,857,635 A *  1/1999 Klippert ................ E05F 11/485
                                                                     242/125.1

(Continued)

FOREIGN PATENT DOCUMENTS

DE    102015116414 A1    3/2017
DE    102016201856 A1    8/2017

(Continued)

*Primary Examiner* — Abdullah A Riyami
*Assistant Examiner* — Thang H Nguyen
(74) *Attorney, Agent, or Firm* — Greer, Burns & Crain, Ltd.

(57) ABSTRACT

A connection system for electrically connecting a fixture in a vehicle has at least one cable, and a housing with a cable inlet and a cable outlet, and with a receiving space which is formed in the housing and extends helically along a housing axis with a receiving space cross section from the cable inlet towards the cable outlet. The cable has a cable cross section and runs completely through the receiving space from the cable inlet towards the cable outlet, with cable coils being formed. A radial extent of the cable cross section is smaller than a radial extent of the receiving space cross section. Therefore, different lengths of the at least one cable can be accommodated in the receiving space with different coil diameters being formed.

11 Claims, 3 Drawing Sheets

(51) Int. Cl.
*H02G 3/38* (2006.01)
*B64C 1/18* (2006.01)

(56) References Cited

U.S. PATENT DOCUMENTS

| | | | | |
|---|---|---|---|---|
| 7,207,833 | B2 * | 4/2007 | Jeong | B60N 2/06 |
| | | | | 297/341 |
| 7,232,312 | B2 * | 6/2007 | Wade | B60R 16/027 |
| | | | | 439/4 |
| 7,959,444 | B2 * | 6/2011 | Corless | H01R 31/06 |
| | | | | 439/4 |
| 2006/0134970 | A1 * | 6/2006 | Watanabe | B60R 16/0215 |
| | | | | 439/501 |
| 2010/0297873 | A1 * | 11/2010 | Burke | H02G 11/02 |
| | | | | 439/501 |
| 2011/0272959 | A1 * | 11/2011 | Lupton | H01R 13/60 |
| | | | | 296/37.8 |
| 2012/0034816 | A1 * | 2/2012 | Woods | H01R 13/72 |
| | | | | 439/501 |
| 2016/0043514 | A1 * | 2/2016 | George | H01R 13/665 |
| | | | | 439/501 |

FOREIGN PATENT DOCUMENTS

| | | | | |
|---|---|---|---|---|
| EP | 2842866 | A1 | 3/2015 | |
| JP | 2018014226 | * | 1/2018 | H01R 13/46 |

* cited by examiner

CONNECTION SYSTEM FOR ELECTRICALLY CONNECTING A FIXTURE IN A VEHICLE

CROSS-REFERENCE TO PRIORITY APPLICATION

This application claims the benefit of, and priority to, German patent application number DE 102018115560.3, filed Jun. 28, 2018. The content of the referenced application is incorporated by reference herein.

TECHNICAL FIELD

Embodiments of the subject matter described herein relate generally to a connection system for electrically connecting a fixture in a vehicle, to a passenger seat system for a vehicle, and to an aircraft with an aircraft fuselage, a cabin formed in the latter, and at least one passenger seat system arranged in the cabin.

BACKGROUND

In many modern means of transport, for example commercial aircraft, electronic entertainment systems and other systems are arranged on passenger seats. Said systems require electric lines in order to be able to produce a connection to corresponding power and data sources on board the means of transport. For this purpose, in particular seat-to-seat cabling is used. In this case, power and data lines extend in each case between individual seats arranged one behind another and form a connecting chain. The individual cables used for this purpose can be arranged and covered in depressions in the vicinity of the floor.

Known cabling and connection systems can reliably carry out the task set for them. However, it may be difficult to realize variable seat distances without separating connections of cabling during the displacement of passenger seats and subsequently restoring same taking the changed seat distance into consideration.

Patent document DE 10 2015 116 414 A1 discloses, for example, a passenger seat system with displaceable seats for a means of transport.

Patent document DE 10 2016 201 856 A1 discloses a connecting arrangement for connection of an interior component, for example a passenger seat, to an electrical system of a vehicle, with a floor panel for forming a cabin floor, a guide channel which is integrated in the floor panel for conducting lines, and a transfer box which is designed for connecting a line of an interior component to an electrical system, wherein the transfer box is connected directly to the guide channel.

Patent document EP 2 842 866 A1 discloses a floor system for inductively transmitting data and energy to devices which are located on the floor and are fastenable in different positions.

BRIEF SUMMARY

When displacing passenger seats, if an inductive solution is not desired, the cable lengths have to be adapted. This can take place by adapting cable lengths or by the manual stowing of excess cable lengths in floor-side channels. It is an object of the disclosure to provide an alternative cable-based connection system for devices in a vehicle, said connection system being able to receive and again dispense different cable lengths as reliably as possible and nevertheless as simply as possible such that different seat distances can therefore be realized.

The object is achieved by a connection system having the features of independent Claim 1. Advantageous embodiments and developments can be gathered from the dependent claims and the description below.

A connection system for electrically connecting a fixture in a vehicle is proposed, the connection system having at least one cable, and a housing with a cable inlet and a cable outlet, and with a receiving space which is formed in the housing and extends helically along a housing axis with a receiving space cross section from the cable inlet towards the cable outlet, wherein the at least one cable has a cable cross section and runs completely through the receiving space from the cable inlet towards the cable outlet, with cable coils being formed, and wherein a radial extent of the cable cross section is smaller than a radial extent of the receiving space cross section, and therefore different lengths of the at least one cable can be accommodated in the receiving space with different coil diameters being formed.

Consequently, a purely passive, cable-based connection system for electrically connecting a fixture is proposed, said connection system being able to receive and again dispense excess cable lengths in a very simple manner. The fixture can be a passenger seat, a passenger seat group or a similar device which could be referred to as a passenger seat or could be assigned to such a passenger seat. This may furthermore also be a displaceable or fixed partition on which entertainment electronics or other devices are arranged.

The entire system includes a combination of a very advantageous housing and at least one cable which extends through the housing. The at least one cable can carry out different tasks. The specific design of the cable is unimportant here. It can be, for example, a multicore cable for transmitting power or for applying a voltage, said power or voltage being conceived for supplying energy or for transmitting data. On the other hand, optical fiber cables can also be used which are suitable for transmitting data. Of course, a plurality of cables which can be arranged separately or in bunched form in the receiving space can also be used.

A particular feature is the helical receiving space in the housing. Helical should be understood here so as to mean that the receiving space encircles the housing axis and at the same time extends in an axial direction, that is to say along the housing axis. The receiving space cross section can be designed here to be as constant as possible. The receiving space is consequently based on a cylindrical basic shape which is deformed helically around the housing axis and along the housing axis. The extent of the receiving space defines a helical movement path for the at least one cable.

The movement path has a width and height which are determined by the receiving space cross section. Since the cable cross section is dimensioned to be smaller than the receiving space cross section, the cable can be placed in a multiplicity of different arrangements in the receiving space. The at least one cable can therefore be placed along the movement path at different points within the receiving space cross section. Depending on the length of the cable, the cable can therefore be wound up either more tightly or more loosely, that is to say with a smaller or greater coil diameter.

If a relatively large excess length of the cable is to be received in the housing, the cable can simply be introduced into the receiving space. As a result, the coil diameter becomes increasingly larger.

If, however, a smaller excess cable length is to be received, the cable can simply be pulled out of the inlet such that consequently the coil diameter is increasingly reduced in size. After removal of a certain length, the cable therefore lies more tightly in the receiving space than previously.

The functioning principle of the connection system according to the disclosure is based completely on passive components which do not require any movable parts and are therefore virtually maintenance-free. In addition, the connection system according to the disclosure can be operated very easily and intuitively and errors in the handling can be virtually completely prevented because of the very simple configuration. Nevertheless, the function of the connection system is highly robust and reliable, and the latter furthermore has a very low weight.

In a preferred embodiment, the housing has an inner radial boundary surface which extends along the housing axis. Said radial boundary surface defines as small a diameter as possible of the receiving space around the housing axis and thereby as small a coil diameter as possible. The receiving space could thereby be adapted, for example, to predetermined minimum bending radii of the corresponding cables. The inner boundary surface could be realized in the form of a hollow-cylindrical component or a hollow-cylindrical region which runs along the housing axis. If the cable is pulled out of the receiving space such that the coil diameter becomes smaller, the cable at a certain length will fit tightly against the inner boundary surface. Further pulling out of the cable from the receiving space is then no longer possible.

As mentioned above, the inner radial boundary surface can have a diameter which corresponds to a minimum bending diameter of the cable or exceeds said bending diameter. By this means, the connection system can prevent damage to the cable due to the latter being wound together excessively strongly. It is therefore not possible to fall short of the bending diameter.

The housing preferably has a helical wall which extends along the housing axis and between a radially inner boundary surface and a radially outer boundary surface. The helical wall here defines the lateral limits of the encircling receiving space. The wall preferably extends from a region at the inlet to a region at the outlet. The number of revolutions about the housing axis determines the length of the extent of the receiving space. It should be noted here that the number of revolutions cannot be increased arbitrarily since, owing to the stiction of the cable in the receiving space, movement within the entire receiving space is prevented after a certain angle of revolution. Depending on the size of the housing, it is recommended to carry out tests until a suitable choice of housing and wall dimensions has been found. It could be appropriate to provide two or three coils of the cable. The helical wall can be realized as a sheet-metal-like part, similarly to a screw pitch. The radially outer and radially inner edges of the wall should preferably be connected to adjacent components in an interlocking or integrally bonded manner such that, upon repeated changing of the length of the received cable and in the event of vibrations during the operation of the vehicle, the function is not impaired. It may also be appropriate to integrally manufacture the housing and the walls arranged therein, for example by means of a 3D printing process.

In a preferred embodiment, the receiving space has at most two coils. A coil should be understood here as meaning a complete revolution about the housing axis. As mentioned above, the movement of a cable in the case of more coils may be made difficult or prevented.

In an advantageous embodiment, the cable is fixed at the cable outlet. The fixing could take place, for example, by arranging one or more rubber rings or other mechanical stoppers which are arranged on the cable and are brought into a force-fitting or interlocking connection with the cable outlet. When the cable is fixed at the cable outlet, the movement of the cable is defined exclusively by pulling the cable out of the cable inlet or pushing the cable into the cable inlet.

In a particularly advantageous embodiment, the connection system according to the disclosure has at least one flexurally soft, tension-proof supporting element which surrounds the at least one cable in a circumferentially flush manner and extends over a substantial part of the length of the cable. The supporting element is a protection device which protects the cable from mechanical impairment. By means of the flexurally soft configuration, the supporting element can completely follow the movement of the cable. However, because of the tension-proof design, it is very easily possible to pull the supporting element instead of the cable in order to influence the coil diameter of the cable. In particular in the case of rather thin and more sensitive cables, the integrity thereof can be ensured. In addition, vibrations which occur during the operation of the vehicle cannot lead, because of the enclosing of the cable, to undesirable friction between the cable and boundary surfaces of the receiving space, which can prevent the cable from becoming worn through. For simplified guidance of the supporting element, rollers can be fastened to the housing, the rollers facilitating the sliding of the chain into and out of the housing and at the same time also preventing tilting. The rollers can be arranged at the cable inlet, in particular on the outside directly after the cable inlet.

The supporting element preferably has a multiplicity of interconnected chain links. The chain links could be produced by way of example from a plastic which has high tensile strength and at the same time generally high mechanical stability. In addition, the chain links can be provided with a surface which has a low coefficient of stiction and which facilitates the pulling of the supporting element or of the cable arranged therein into the receiving space. The chain links in each case encircle an outer circumference of the cable completely and are preferably mounted on one another so as to be pivotable about at least one axis such that the housing axis can be revolved. However, the chain links and the bearings lying in-between are intended to be configured in such a manner that they additionally permit an axial movement of the chain links along the housing axis.

The disclosure furthermore relates to a passenger seat system for a cabin of a vehicle, having a plurality of seat units which are lockable in the cabin in a manner spaced apart from one another and each have at least one connection system having the features presented above. The housing is fastenable here in particular to a seat unit.

A seat unit should be understood in this context as meaning a passenger seat or a passenger seat group with a frame which is lockable in the cabin of the vehicle via known locking devices. In the case of an aircraft, the frame can be, for example, a frame which carries up to three, four or five passenger seats. However, individual passenger seats or pairs of passenger seats on a frame are also conceivable. In particular, the seat units are adapted to be locked to a seat rail or a sliding rail which is arranged on a floor of the vehicle. An individual housing can be arranged on a frame assigned to a plurality of passenger seats and can be passed through by one or more cables which are provided for the connection even of a plurality of electronic units.

Finally, the disclosure relates to a vehicle having a cabin and at least one passenger seat system of this type. The vehicle is preferably an aircraft and in particular a passenger aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible uses will emerge from the description below of the exemplary embodiments and from the figures. Here, all of the features described and/or illustrated in the figures, individually and in any desired combination, form the subject matter of the disclosure even independently of their composition in the individual claims or the dependency references thereof. Furthermore, in the figures, the same reference signs are used for identical or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
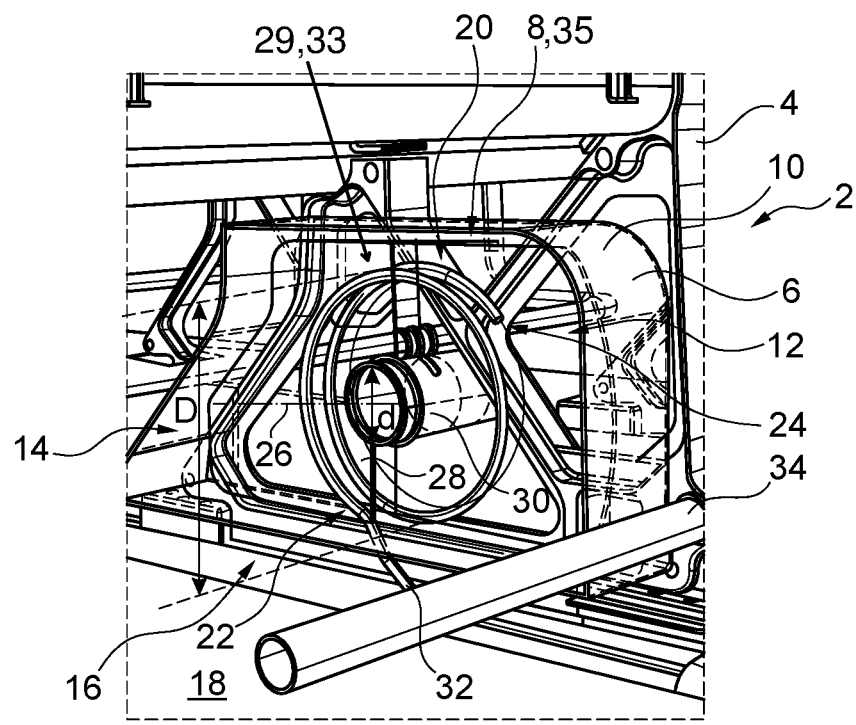
FIG. 1 shows a connection system in a perspective view with a transparent housing.

FIG. 1 shows a connection system 2 for electrically connecting a fixture 4, which is embodied here by way of example as a vehicle seat. The connection system 2 has a housing 6, the shape of which fits harmoniously into an existing construction space of the fixture 4.

The housing 6 has an interior 8 which is defined by an edge 10 and two covers 12 and 14 running parallel to each other. The housing 6 is arranged on the fixture 4 by way of example in such a manner that it substantially ends with a lower side 16 of the fixture 4 and is consequently close to a floor 18 of the cabin.

A receiving space 20 is formed in the interior 8, said receiving space extending helically from a cable inlet 22 as far as a cable outlet 24. The receiving space 20 encircles a housing axis 26 here. The receiving space 20 is configured by means of helical walls 28 so as to form a screw shape. A radially inner boundary surface 30 encircles the housing axis 26 and defines a radially inner boundary of the receiving space 20.

A cable 32 extends from the cable inlet 22 as far as the cable outlet 24 and thereby follows the screw shape of the receiving space 20. The receiving space 20 is dimensioned in such a manner that the cable 32 by way of example encircles the housing axis 26 twice. The cable 32 can therefore have two complete coils in the housing 6. There are no means in the receiving space 20 for tensioning or for holding the cable 32 in any way. On the contrary, the cable 32 is located loosely in the receiving space 20 and can take up an untensioned position.

This makes it possible for the connection system to receive a cable length which is randomly excessive within a large range by the cable 32 being inserted into the receiving space 20 or being pulled out of the latter. By means of the insertion, the coil diameter of the cable 32 is increased until the cable butts against radially outer boundary surfaces in the interior of the receiving space 20, should such an excess length be present. When the cable 32 is pulled out of the cable inlet 22, the coil diameter of said cable is reduced, and therefore the cable 32 is placed successively onto the inner boundary surface 30 and is then protected against further pulling out. The inner boundary surface 30 is provided in particular so as not to fall below a predetermined minimum bending radius of the cable 32.

Merely for the sake of completeness, it is mentioned that a baggage bar 34 is located directly following the housing 6, said baggage bar permitting limited pushing of items of luggage under a seat 4. The housing 6 can consequently be arranged on a front section of the fixture 4, in particular directly above or directly adjacent to a seat rail.

Figure 2:
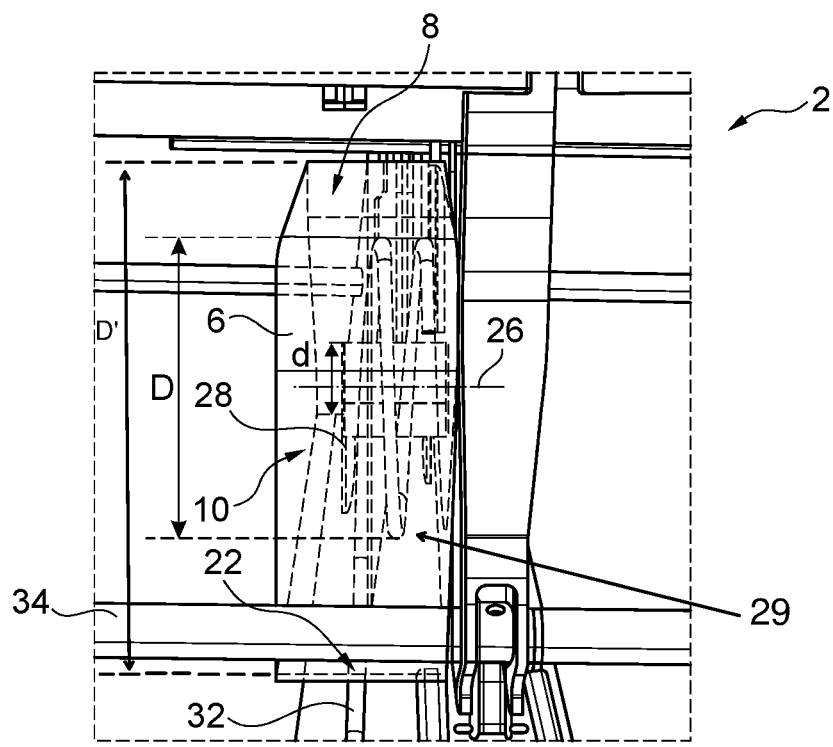
FIG. 2 shows the connection system in a front view.

FIG. 2 shows the connection system 2 from a different perspective. The housing 6 is illustrated here looking at the edge surface 10. The helical division of the interior 8 by the helical wall 28 can clearly be seen here. The wall 28 extends in the manner of a helix from the radially inner boundary surface 30 outwards in the radial direction and protrudes virtually as far as an inner side of the edge surface 10. The cable 32 which is introduced into the receiving space 20 through the cable inlet 22 follows the screw shape of the wall 28.

In the illustration shown, an average coil diameter D of the cable 32 is larger than the diameter d of the radially inner boundary surface 30 and smaller than the extent in the vertical direction in the housing 6. It would consequently be possible to push the cable 32 even further into the housing 6 or to pull same even further out.

Figure 3:
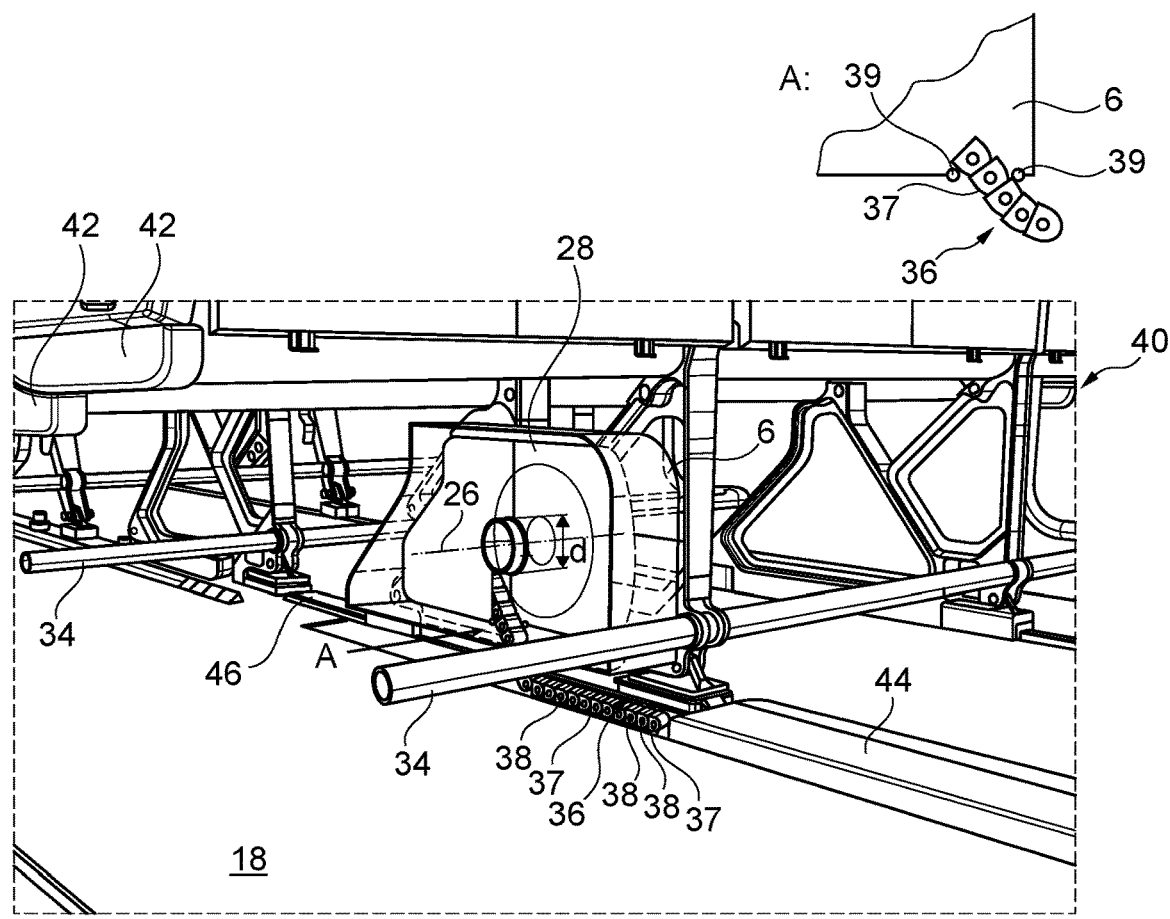
FIG. 3 shows a partial section of the connection system in a perspective view.

FIG. 3 illustrates the connection system 2 with non-transparent helical walls 28. In addition, the cable 32 is surrounded here by a tension-proof, flexurally soft supporting element 36 which mechanically protects the cable 32. In the illustration shown, the supporting element 36 is designed in the form of a multiplicity of interconnected chain links 37. The latter are interconnected in pairs by articulated connections 38 by means of which overall movability at least around the housing axis 26 is permitted. When a suitable material is selected for the chain links 37, for example a plastic, a certain flexibility in a direction parallel to the housing axis 26 can also be permitted. As a result, the supporting element, in addition to the encircling coil around the housing axis 26, can also extend along the housing axis 26.

For example, two mutually opposite rollers 39 are arranged at the cable inlet 22, which runs approximately parallel to the cabin floor 18, between which rollers the supporting element 36 is guided into or out from the housing 6. This prevents tilting of the supporting element 36 at the cable inlet 22.

In addition, FIG. 3 shows a passenger seat system 40 with a plurality of passenger seat units 42 which are arranged one behind another on the floor 18. By way of example, the front passenger seat unit 42 has the connection system 2. The cable 32 extends under a covering 44 which is arranged on a sliding rail 46 and protects the latter from mechanical impairment and soiling. In addition, the sliding rail 46 is covered over a relatively large area in order to avoid a significant step formation on the cabin floor 18. In order to compensate for an excessive cable length during the displacement of the passenger seat unit 42 on the floor 18, the cable 32 or the supporting element 36 can be pulled out of the receiving space 20 or pushed into the latter again.

Figure 4:
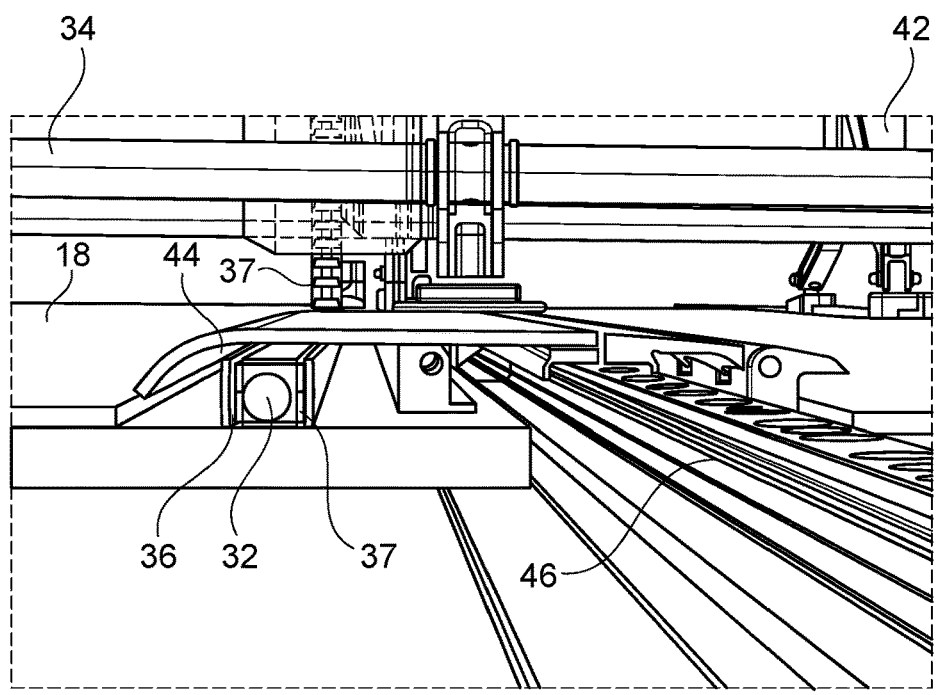
FIG. 4 shows a view of the cable below a covering on a cabin floor.

The arrangement of the cable 32 and of the supporting element 36 is illustrated in FIG. 4. The covering 44 extends here over the sliding rail 46 on which the passenger seat unit 42 is displaceable. The cable 32 and the supporting element 36 remain fixed in a predetermined position under the covering 44 and, during the displacement of the seat unit 42, can change their form in order to release a length or to accommodate excessive cable in the receiving space 20.

Figure 5:
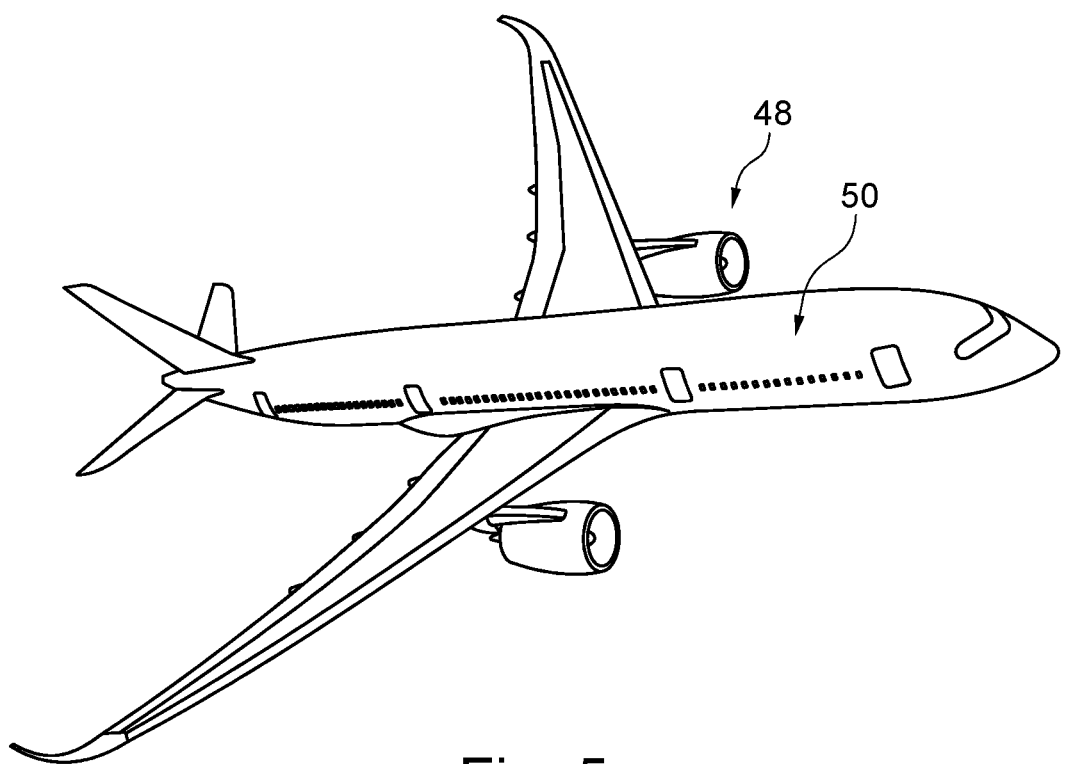
FIG. 5 shows an aircraft having passenger seats and connection systems according to an embodiment of the invention.

FIG. 5 finally shows an aircraft having a cabin 50 which is formed therein and in which at least one passenger seat system 40 is situated.

It is additionally noted that "having" does not rule out other elements or steps, and the words "a" or "an" do not rule out a multiplicity. It is also noted that features that have been described with reference to one of the above exemplary embodiments can also be used in combination with other features of other exemplary embodiments described above. Reference signs in the claims should not be regarded as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A connection system for electrically connecting a fixture in a vehicle, the connection system comprising:
   at least one cable; and
   a housing comprising a cable inlet, a cable outlet, a receiving space formed in the housing, a helical wall extending along a housing axis and defining a receiving space, the receiving space extending from the cable inlet towards the cable outlet;
   wherein the at least one cable has runs completely through the receiving space from the cable inlet towards the cable outlet, with one or more cable coils being formed, the one or more cable coils having a coil diameter; and
   wherein coil diameter is smaller than the receiving space diameter, such that different lengths of the at least one cable can be accommodated in the receiving space with different coil diameters being formed.

2. The connection system according to claim 1, wherein the housing has an inner radial boundary surface which extends along the housing axis.

3. The connection system according to claim 2, wherein the inner radial boundary surface has a diameter which corresponds to a minimum bending diameter of the cable or exceeds said bending diameter.

4. The connection system according to claim 1, wherein the helical wall extends along the housing axis and between a radially inner boundary surface and a radially outer boundary surface.

5. The connection system according to claim 1, wherein the receiving space has at most two coils.

6. The connection system according to claim 1, wherein the cable is fixed at the cable outlet.

7. The connection system according to claim 1, further comprising at least one flexurally soft, tension-proof supporting element which surrounds the at least one cable in a circumferentially flush manner and extends over a substantial part of the length of the cable.

8. The connection system according to claim 7, wherein the supporting element has a multiplicity of interconnected chain links.

9. A passenger seat system for a cabin of a vehicle, comprising:
   a plurality of passenger seat units which are lockable in a manner spaced apart from one another in the cabin, and each of the plurality of passenger seat units having at least one connection system according to claim 1.

10. A vehicle comprising:
    a cabin; and
    at least one passenger seat system according to claim 9.

11. The vehicle according to claim 10, wherein the vehicle is an aircraft.

* * * * *